(12) United States Patent
Schaap

(10) Patent No.: US 8,105,034 B2
(45) Date of Patent: Jan. 31, 2012

(54) VERTICAL-AXIS WIND TURBINE AND METHOD FOR THE PRODUCTION THEREOF

(75) Inventor: Antonius Bernardus Schaap, Hilversum (NL)

(73) Assignee: Ecofys Investments B.V., Rotterdam (NL)

( * ) Notice: Subject to any disclaimer, the term of this patent is extended or adjusted under 35 U.S.C. 154(b) by 445 days.

(21) Appl. No.: 12/442,363

(22) PCT Filed: Sep. 20, 2007

(86) PCT No.: PCT/NL2007/000235
§ 371 (c)(1),
(2), (4) Date: Mar. 20, 2009

(87) PCT Pub. No.: WO2008/035963
PCT Pub. Date: Mar. 27, 2008

(65) Prior Publication Data
US 2010/0086406 A1    Apr. 8, 2010

(30) Foreign Application Priority Data
Sep. 21, 2006    (NL) .................................... 1032555

(51) Int. Cl.
*H63H 1/06*    (2006.01)
*F03B 29/34*    (2006.01)
*B64C 11/04*    (2006.01)
*B21D 53/78*    (2006.01)

(52) U.S. Cl. ............ 416/132 B; 416/227 R; 416/204 R; 29/889

(58) Field of Classification Search .............. 416/204 R, 416/1, 133 B, 132 B, 227 R, 227 A, 229 A, 416/211; 415/2.1, 3.1, 4.2; 290/44, 54, 55; 29/889, 889.21, 889.71
See application file for complete search history.

(56) References Cited

U.S. PATENT DOCUMENTS

| | | | |
|---|---|---|---|
| 3,918,839 A | 11/1975 | Blackwell et al. | |
| 4,449,053 A * | 5/1984 | Kutcher | ......................... 290/44 |
| 7,008,171 B1 | 3/2006 | Whitworth | |

FOREIGN PATENT DOCUMENTS

| | | |
|---|---|---|
| DE | 3825241 | 10/1989 |
| DE | 3825241 A | 10/1989 |
| JP | 2005282540 | 10/2005 |
| SE | 505221 C | 7/1997 |
| WO | WO-2005003552 | 1/2005 |

* cited by examiner

*Primary Examiner* — Thomas L Dickey
*Assistant Examiner* — Nikolay Yushin
(74) *Attorney, Agent, or Firm* — Shewchuk IP Services, LLC; Jeffrey D. Shewchuk

(57) ABSTRACT

The invention relates to a vertical-axis wind turbine and at least 2 turbine blades, wherein every turbine blade is connected via a supporting arm and a connecting element that can be purely tensile-loaded to the rotatable vertical axis. According to the invention, between the connecting element that can be purely tensile-loaded and the supporting arm a blade is provided that is convex at an angle of attack side defined by the turbine blades and is concave at the other side. The invention also relates to a method for manufacturing a wind turbine.

15 Claims, 2 Drawing Sheets

VERTICAL-AXIS WIND TURBINE AND METHOD FOR THE PRODUCTION THEREOF

CROSS REFERENCE TO RELATED APPLICATIONS

The present application is the U.S. National Phase of International Patent Application Serial No. PCT/NL2007/000235, filed Sep. 20, 2007, which claims the benefit of Dutch Patent Application Serial No. 1032555, filed on September 21, both of which are hereby incorporated by reference in their entireties.

BACKGROUND

A vertical-axis wind turbine (VAWT), also called a Darrieus wind turbine, is widely known. Such a wind turbine has two or more turbine blades (having a wing profile), which turbine blades are located rotation-symmetrically with respect to the vertical axis. A Darrieus wind turbine has as an advantage over a wind turbine with a horizontal axis (HAWT) that there is no need to pitch it in the direction of the wind. Another advantage is that the work generated by the VAWT can be used in a simple manner, usually using a generator that is arranged stationary. In this way the construction of the wind turbine can be lighter and cable twist is avoided, which makes the control of such a wind turbine easier than that of a HAWT. The turbine blades of the oldest type of VAWT are straight, vertically arranged turbine blades having a wing profile. Because of the "centrifugal force" which occurs during rotation, said blades are exposed to large forces. Therefore later developments have led to curved turbine blades having a catenary line or troposkien shape. Wind turbines having a vertical axis have as a disadvantage that they do not readily start up when the wind starts blowing. Therefore, it has long been known to provide these wind turbines with a Savonius rotor, which solves this problem.

In order to be competitive with others means of generating energy, in particular in order to compete with fossil fuels, there is a constant need to reduce the production cost of the wind turbines. With wind turbines however, numerous others factors play a contributory role, such as noise pollution, strength in case of extreme winds, reliability during operation and sensitivity for maintenance etc.

SUMMARY

An aspect of the present invention is to provide a vertical-axis wind turbine which on the one hand can be produced in a simple manner and on the other hand meets the above mentioned requirements to a large extent.

Thus, the present invention relates to a vertical-axis wind turbine, which wind turbine comprises a rotatable vertical axis as well as at least two turbine blades, wherein every turbine blade has an upper and a lower end, at least one end of every turbine blade is attached via a supporting arm to the rotatable vertical axis, the supporting arm has a proximal end connected to the rotatable vertical axis and a distal end located near the end of a turbine blade, the wind turbine further is provided with a connecting element that can be purely tensile-loaded, which has a proximal end connected to the rotatable vertical axis and a distal end located at a distance of the rotatable vertical axis. The proximal end of the connecting element that can be purely tensile-loaded is connected to the rotatable vertical axis at a location that lies outside the section of the rotatable vertical axis that is taken up by the projection of the turbine blade on the rotatable vertical axis. The distal end of the connecting element that can be purely tensile-loaded is connected to at least one of i) the distal end of a supporting arm, and ii) to an end of a turbine blade connected to said distal end of said supporting arm.

Moreover, the wind turbine according to the invention includes a blade that is provided between the connecting element that can be purely tensile-loaded and the supporting arm, the blade being convex at an angle of attack side defined by the turbine blades and concave at the other side, and the blade having an angle of attack edge, wherein a) lines formed by projecting on a horizontal plane of 1) the angle of attack edge, and 2) a line between the proximal end and the distal end of the supporting arm, are at an acute angle with each other, and b) a first line formed by projecting the angle of attack edge on a horizontal plane has a first length, and a second line, formed by projecting the angle of attack edge on a vertical plane which passes through the rotatable vertical axis and the distal end of the supporting arm, has a second length, and the first length is larger than the second length.

Thus a large flow-through surface, which determines the amount of energy that can be generated, is provided by the large distance between the turbine blades and the axis, using a reliable construction formed by the connecting element that can be purely tensile-loaded and the supporting arm. The supporting arm is an element that can be pressure-loaded. The term "can be purely tensile-loaded" in conjunction with connecting element is a technical term which indicates that a tensile force is not absorbed by means of bending of the connecting element but in the direction between the proximal and distal end of the connecting element. The blade, which itself does not substantially contribute to the strength of the connection of the turbine blade and the rotatable vertical axis, operates as a Savonius blade. Thus, in an inexpensive manner, a vertical-axis wind turbine that will readily start up is provided. The blade can be integrated with at most one of the element that can be purely tensile-loaded and the supporting arm (i.e. formed out of one piece), but is in practice a separately manufactured element that is connected to at least one of the rotatable vertical axis, and the element that can be purely tensile-loaded, the supporting arm. Advantageously, the blade is formed from a metallic or plastic plate. More specifically, the blade can be a separately manufactured plastic element that is pre-formed by means of a mould. Where in the present application in conjunction with angle of attack side, "defined by the turbine blades" is mentioned, then it is meant that the profile of the turbine blades determines the rotational direction of the wind turbine, wherein the rotational direction defines the angle of attack side. The angle of attack edge of the blade is defined by those points of the blade that, for each distance to the rotation axis upon projection of the blade on a horizontal plane, are located furthest away from the intersection line between the horizontal plane and a vertical plane that runs through the rotation axis and the distal end of the supporting arm. In the present application the term rotatable vertical axis can be interchanged with the term rotor axis. The acute angle as defined at a) is located near the distal end of the supporting arm.

Preferably, the connecting element that can be purely tensile-loaded has the shape of a strip.

A strip is inexpensive, can absorb a large force in particular due to its large width compared to a guy wire of the same thickness, and can be connected to the turbine blade in a simple manner.

In an advantageous embodiment the strip has a kink at its distal end and is connected to the end of a turbine blade.

Thus, in a simple manner a strong connection can be provided over a large surface area. This is achieved, for instance, by mounting in the end of the turbine blade a filler body that can be pressure-loaded, and to connect at that location the distal end of the connecting element that can be purely tensile-loaded and the end of the turbine blade by means of through-bolts or the like.

Another embodiment is characterized in that the blade shields at least one of i) the distal end of the connecting element that can be purely tensile-loaded, ii) the connecting element that can be purely tensile-loaded and iii) the supporting arm.

Thus, noise pollution is limited and the need for an aerodynamically shaped connecting element and/or supporting arm can be avoided. Also, noise pollution of protruding heads of bolts or of nuts can be avoided, while the construction remains uncomplicated. Preferably, at least i) and iii), and most preferentially ii) and iii) wherein ii) comprises i)—are shielded.

According to one embodiment, as seen from the angle of attack side, the blade has the shape of a triangle.

This triangle is in effect defined by a) the connection of the connecting element and the supporting arm, b) the connection of the supporting arm to the axis, and c) the connection of the connecting element to the axis. While not wishing to be bound by any theory, it is believed that thus the relatively low tip speed ratio of a Savonius rotor can be harmoniously combined with the high tip speed ratio of a Darrieus rotor, without the Savionius rotor excessively reducing the yield of the wind turbine under favourable conditions for producing wind power.

The invention also relates to a method for manufacturing a vertical-axis wind turbine according to any of the preceding claims.

In an embodiment of the method of the invention, an axis is provided with a supporting arm, a connecting element that can be purely tensile-loaded and a turbine blade, and a blade is provided between the supporting arm and the connecting element that can be purely tensile loaded which is convex at an angle of attack side defined by the turbine blade and is concave at the other side, and the blade has an angle of attack edge having a directional component which is substantially perpendicular to the axis.

Thus, it is possible to provide a readily starting up vertical-axis wind turbine at low cost. The order in which the blade is connected to at least 1 of the supporting arm, the axis, and the connecting element that can be purely tensile-loaded is free, but in general it will be preferred to mount the blade last.

A simple embodiment is characterized in that the blade is a separately manufactured blade that is attached to both the connecting element that can be purely tensile-loaded and the supporting arm.

This will sufficiently maintain the shape of the blade, also when it is designed relatively thin (and thus inexpensive).

In contrast to FI934351, in the present invention for each part of the construction an element can be used which, for the particular purpose of the element, has optimal properties at as low as possible cost. This applies to properties such as aerodynamic properties, which no longer play a role for the supporting arm and/or the connecting element that can be purely tensile-loaded, as a result of which these elements may be chosen for their strength, suitability for being connected to others elements (axis, turbine blade) and material properties. Here preferably at least one of the connecting element that can be purely tensile-loaded, the supporting arm and the blade is manufactured of steel.

For a simple and reliable attachment of a turbine blade, a preferred method includes a connecting element that can be purely tensile-loaded having a kink, wherein the kinked part of the connecting element is connected to the turbine blade.

The blade can be provided such that the blade shields at least one of i) the distal end of the connecting element that can be purely tensile-loaded, ii) the connecting element that can be purely tensile-loaded and iii) the supporting arm.

BRIEF DESCRIPTION OF THE DRAWINGS

The present invention will now be illustrated by the drawings, wherein.

DETAILED DESCRIPTION OF EMBODIMENTS OF THE INVENTION

Figure 1:
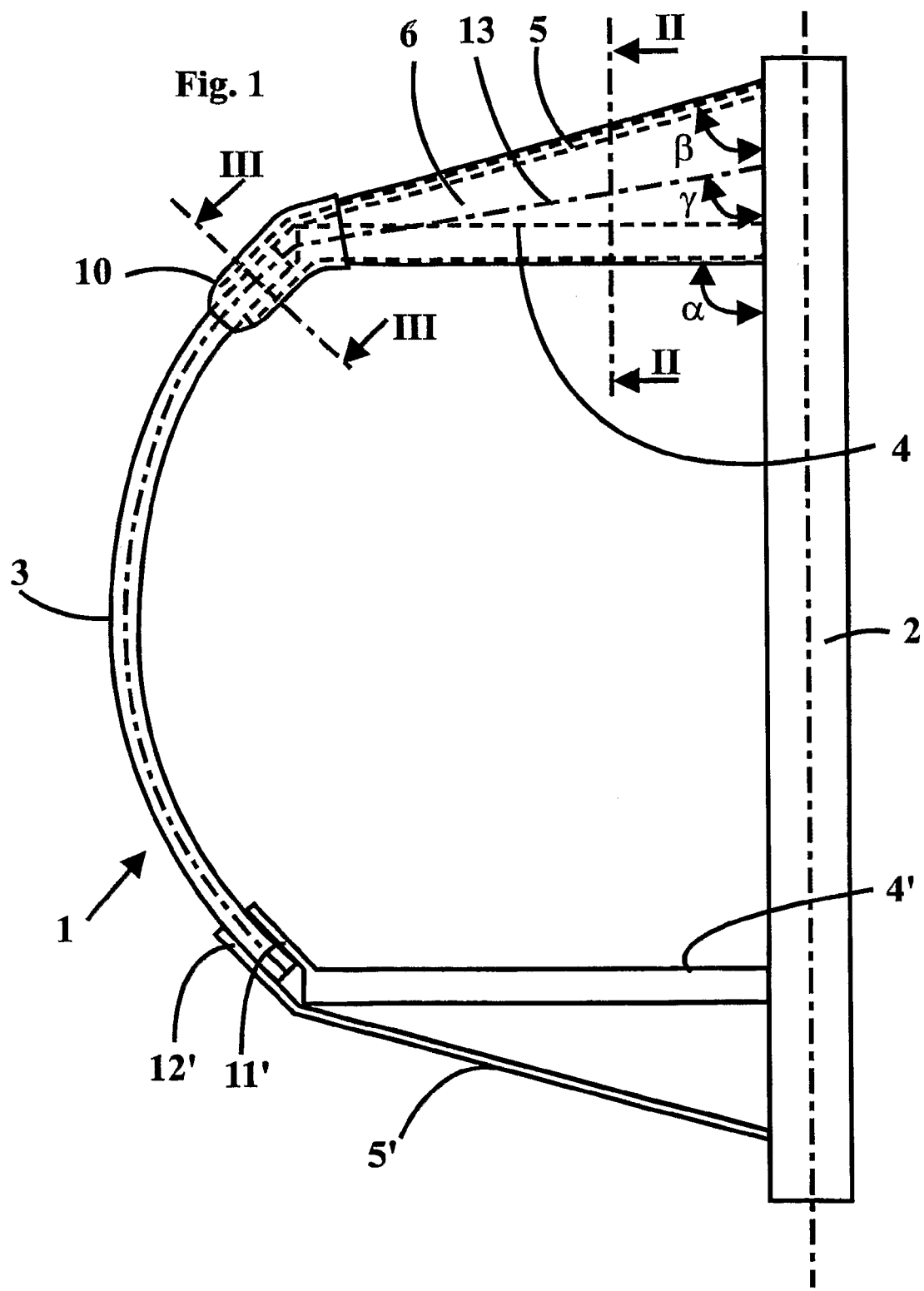
FIG. 1 represents a side view of a vertical-axis wind turbine according to the invention.
Figure 2:
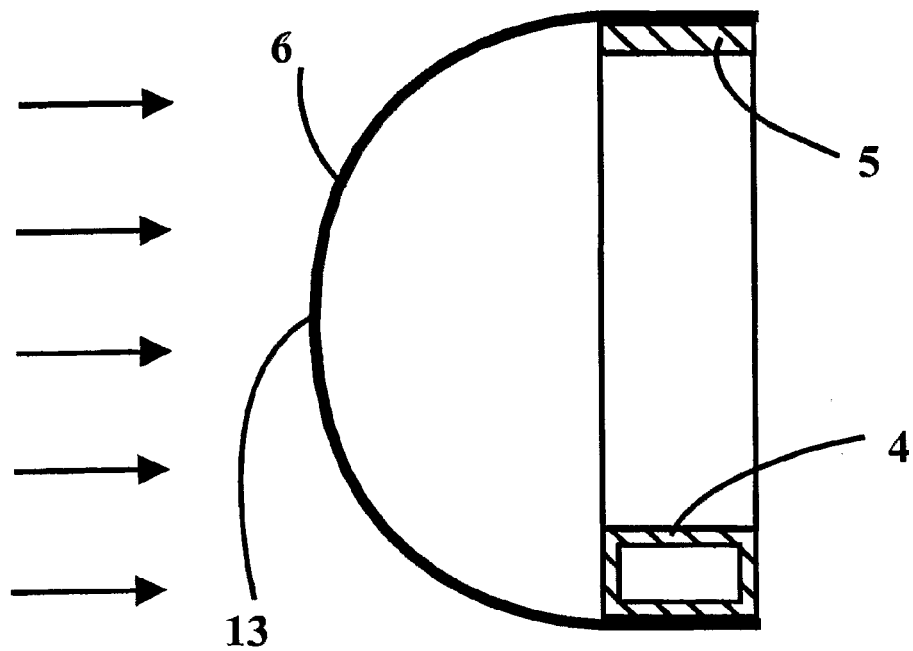
FIG. 2 shows a cross section along line II-II of FIG. 1.

In FIG. 1 a Darrieus rotor 1 is shown which has a vertical axis 2 and rotor blades, of which one rotor blade 3 is shown. The rotor blade 3 is, at the ends thereof, attached to the vertical axis 2 via supporting arms 4, 4'. The supporting arms 4, 4' are supporting arms that can be pressure-loaded and here have the shape of a profile having a rectangular cross section (FIG. 2). The ends of the rotor blade are also connected to the axis 2 via strips that can be purely tensile-loaded 5, 5'. The combination of the supporting arms 4, 4' and the strips that can be purely tensile-loaded 5, 5' enables a reliable and very strong construction. The strips 5, 5', the supporting arms 4, 4' and the axis 2 are for instance made of steel.

According to the invention a blade 6 is provided between a strip that can be purely tensile-loaded 5 (5') and the supporting arm 4 (4'). In FIG. 1 blade 6' is omitted, which from a practical point of view is indeed possible, but it is preferred that a blade is present both above and below. It goes without saying that from the point of view of stability it is necessary that the centre of gravity of the parts of the Darrieus rotor connected to the axis coincides with the axis 2. By way of example, for a Darrieus rotor having an odd number of rotor blades 3 this means that all rotor blades 3 either all have to be provided with a blade 6 at their top, all have to be provided with a blade 6' at their bottom or all have to be provided with blades 6, 6' both at the bottom and at the top. With respect to the wind flow, the blades 6 co-operate with each other, on which the operation of a Savionius-rotor relies. The same applies for blades 6'.

Blade 6, 6' is, for instance, formed from a plastic plate or thin sheet steel and is preferably attached to both the strip that can be purely tensile-loaded 5, 5' and the supporting arm 4, 4'. Any such construction is very inexpensive and also very effective. The blade 6, 6' preferably shields the strip 5, 5' and the supporting arm 4, 4' (i.e. hides it from view seen from the angle of attack side) whereby it is achieved that the strip 5, 5' and the supporting arm 4, 4' can be designed non-aerodynamically and thus more cheaply. The blade 6, 6' thus shaped, projected on a vertical plane that runs through the rotation axis and the distal end of the supporting arm, has the shape of a triangle, of which it is thought that the relatively low optimal tip speed ratio of a Savonius rotor can be thus harmoniously combined with the high optimal tip speed ratio of a Darrieus rotor.

The angle α of the supporting arm 4 with the vertical axis 2 is generally 70 to 110°, preferably 85 to 95° and the (enclosed) angle β between the strip 5 and the vertical axis 2 is generally 60-90° preferably 70-80°.

The blade 6 has a section that is reached first by the wind, the angle of attack edge 13, which is depicted here as a dotted line. The angle γ which this angle of attack edge 13 in projection on the plane formed by the vertical axis 2, the supporting arm 4, 4' and the strip 5, 5' makes, is preferably (α+β)/2.

In FIG. 2 a cross section along line II-II of FIG. 1 is depicted. Here, the supporting arm 4 can be seen, in this embodiment designed as a non-aerodynamic, in particular rectangular profile. Furthermore, the strip 5 is shown, as well as the blade 6 that encloses both the strip 5 and the supporting arm and shields them from the wind (arrows; the angle of attack side is thus at the left in the figure). The blade 6 is connected to the supporting arm 4 and the strip 5 by means of a glue joint, blind rivets, or the like. The blade 6 is not of the bearing type, but does have sufficient shape rigidity to withstand the forces exerted by the wind without substantial deformation. The blade 6 and the glue joint are flexible (non-brittle), so that these can absorb slight deformations and/or angle distortions experienced by the supporting arm 4 and the strip 5, depending on the rotational, speed of the wind turbine 1.

Figure 3:
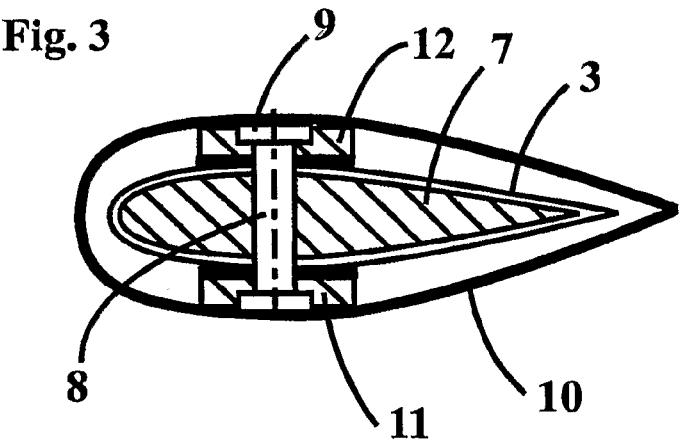
FIG. 3 shows a cross section along line III-III of FIG. 1.

FIG. 3 shows a cross section along line III-III of FIG. 1 and shows in more detail the connection of the supporting arm 4 and the strip 5 to the upper end of the turbine blade 3. Since turbine blades 3 have to be light, they are in practice designed hollow (for instance extruded aluminum of aviation grade). For effectively connecting the end to the supporting arm 4 and the strip 5, a filler body 7 that can be pressure-loaded is inserted in the end of the turbine blade (the filler body 7 is shown hatched). The supporting arm 4 and the strip 5 have at their respective (distal, i.e. located at a distance from the vertical axis 2) ends kinked members 11 and 12 respectively (in FIG. 1 the counterparts 11' and 12' are shown), which are connected to one another by means of a bolted joint. The bolted joint comprises a bolt 8 and a nut 9. Since that bolted joint and also the distal parts of the supporting arm 4 and strip 5 could cause noise pollution, it is preferred to mount a cap 10 having a wing profile around the bolted joint. The cap 10 will be made of plastic and usually consist of two halves which, for instance, are connected with one another through a click connection. The cap 10 preferably abuts to the blade 6, or there is some overlap between the cap 10 and the blade 6.

Figure 4:
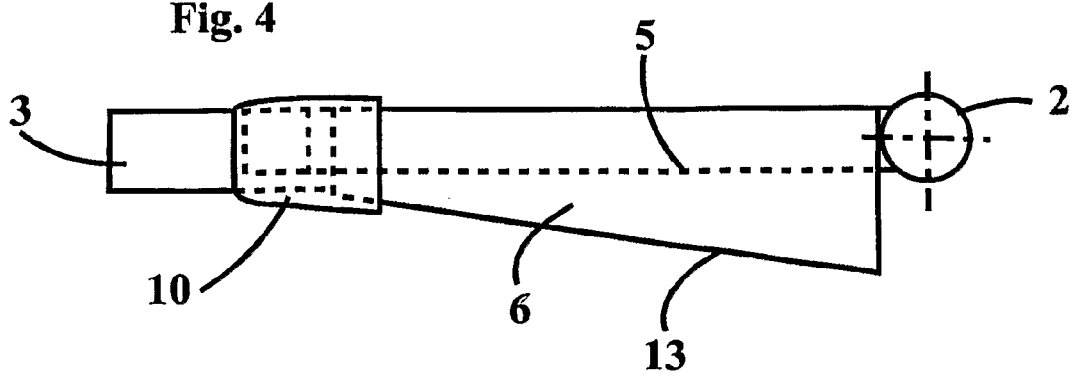
FIG. 4 shows a partial top view of the wind turbine of FIG. 1.

FIG. 4 shows part of the wind turbine top view and in particular the rotor axis 2, the rotor blade 3 and the angle of attack edge 13. The wind turbine is rotation-symmetric.

The wind turbine according to the invention has been disclosed as a wind turbine having a vertical axis. In principle, it is possible to position the axis of the wind turbine at an angle different from perpendicular to the surface of the earth, by turning the axis in a plane transverse to the wind direction over, for instance, 90°. In this case, the benefits of the present invention are retained. Any such arrangement could have the disadvantage that either the wind turbine does not function equally well at every wind direction, or the wind turbine has to be pitched to the wind, just like a HAWT. Where in the present invention a horizontal plane is mentioned, a plane transverse to the rotational axis of the wind turbine is meant. Where in the present invention a vertical plane is mentioned, the plane defined by the rotational axis and the end of the supporting arm is meant.

Although the preferred form of the invention has been shown and described, many features may be varied, as will readily be apparent to those skilled in this art. It is the intention, therefore, to be limited only as indicated by the scope of the claims appended hereto.

The invention claimed is:

1. A vertical-axis wind turbine comprising:
   a rotatable vertical axis;
   at least two turbine blades, each turbine blade having an upper and a lower end;
   a supporting arm attaching at least one of the upper and lower end of each turbine blade to the rotatable vertical axis, the supporting arm having a proximal end connected to the rotatable vertical axis and a distal end located near the corresponding end of the respective turbine blade;
   a connecting element that can be purely tensile-loaded having a proximal end connected to the rotatable vertical axis and a distal end located at a distance from the rotatable vertical axis, the proximal end of the connecting element that can be purely tensile-loaded being connected to the rotatable vertical axis at a location that lies outside a part of the rotatable vertical axis that is taken up by a horizontal projection of the turbine blade on the rotatable vertical axis, the distal end of the connecting element that can be purely tensile-loaded being connected to at least one of the distal end of a respective supporting arm, and an end of a turbine blade connected to the distal end of the respective supporting arm; and
   a convex/concave blade disposed between the connecting element that can be purely tensile-loaded and the supporting arm, the convex/concave blade being convex at an attack side defined by a direction of power generation rotation of the turbine blades and concave at a side opposite the attack side, the convex/concave blade having an angle of attack edge, wherein
   a first line defined by projecting the angle of attack edge on a horizontal plane, and a second line defined by a projection on a horizontal plane between the proximal end and the distal end of the supporting arm, are at an acute angle with each other, and
   the first line has a first length, and a third line, defined by projecting the angle of attack edge on a vertical plane passing through the rotatable vertical axis and the distal end of the supporting arm, has a second length, and the first length is larger than the second length.

2. The vertical-axis turbine according to claim 1, wherein the connecting element that can be purely tensile-loaded has the shape of a strip.

3. The vertical-axis turbine according to claim 2, wherein the strip has a kink at its distal end and is connected to a corresponding end of respective a turbine blade.

4. The vertical-axis turbine according to claim 1, wherein the convex/concave blade shields at least one of the distal end of the connecting element that can be purely tensile-loaded, the connecting element that can be purely tensile-loaded and the supporting arm.

5. The vertical-axis turbine according to claim 1, wherein the blade has shape of a triangle when viewed from the attack side.

6. A method of manufacturing a vertical-axis wind turbine, the method comprising:
   providing rotatable vertical axis;
   attaching at least one of upper and lower end of a turbine blade to the rotatable vertical axis with a supporting arm, the supporting arm having a proximal end connected to the rotatable vertical axis and a distal end located near the corresponding on end of turbine blade;

connecting a proximal end of a connecting element to the rotatable vertical axis at a location lying outside of a section of the rotatable vertical axis defined by a horizontal projection of the turbine blade on the rotatable vertical axis;

connecting a distal end of the connecting element to at least one of the distal end of the supporting arm and the corresponding end of the turbine blade; and providing a blade between the supporting arm and the connecting element that can be purely tensile-loaded, the blade being convex at an attack side defined by a direction of power generation rotation of the turbine blade and concave at a side opposite the attack side, and the blade including an angle of attack edge having a directional component which is substantially perpendicular to the rotatable vertical axis, wherein a first line defined by projecting the angle of attack edge on a horizontal plane, and a second line defined by a projection on a horizontal plane between the proximal end and the distal end of the supporting arm, are at an acute angle with each other, and the first line has a first length, and a third line, defined by projecting the angle of attack edge on a vertical plane passing through the rotatable vertical axis and the distal end of the supporting arm, has a second length, the first length being larger than the second length.

7. The method according to claim 6, wherein the blade is separately manufactured from and attached to both the connecting element that can be purely tensile-loaded and the supporting arm.

8. The method according to claim 6, wherein at least one of the connecting element that can be purely tensile-loaded, the supporting arm and the convex/concave blade comprises steel.

9. The method according to claim 6, further comprising providing the connecting element that can be purely tensile-loaded with a kink, and connecting a kinked part of the connecting element to the turbine blade.

10. The method according to claim 6, wherein the convex/concave blade shields at least one of the distal end of the connecting element that can be purely tensile-loaded, the connecting element that can be purely tensile-loaded and the supporting arm.

11. A method of manufacturing a vertical-axis wind turbine, the method comprising:

providing an axis with a supporting arm, a connecting element that can be purely tensile-loaded and a turbine blade; and providing a convex/concave blade between the supporting arm and the connecting element that can be purely tensile-loaded, the convex/concave blade being convex at an attack side defined by a direction of power generation rotation of the turbine blade and concave at a side opposite the attack side, and the convex/concave blade including an angle of attack edge having a directional component which is substantially perpendicular to the axis.

12. The method according to claim 11, wherein the convex/concave blade is separately manufactured from and attached to both the connecting element that can be purely tensile-loaded and the supporting arm.

13. The method according to claim 11, wherein at least one of the connecting element that can be purely tensile-loaded, the supporting arm and the convex/concave blade comprises steel.

14. The method according to claim 11, further comprising providing the connecting element that can be purely tensile-loaded with a kink, and connecting a kinked part of the connecting element to the turbine blade.

15. The method according to claim 11, wherein the convex/concave blade shields at least one of the distal end of the connecting element that can be purely tensile-loaded, the connecting element that can be purely tensile-loaded and the supporting arm.

* * * * *